US010045048B2

(12) United States Patent
Nam et al.

(10) Patent No.: US 10,045,048 B2
(45) Date of Patent: Aug. 7, 2018

(54) METHOD AND APPARATUS FOR DECODING MULTI-VIEW VIDEO

(71) Applicant: LG ELECTRONICS INC., Seoul (KR)

(72) Inventors: Junghak Nam, Seoul (KR); Jin Heo, Seoul (KR); Taesup Kim, Seoul (KR); Jungdong Seo, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 15/028,905

(22) PCT Filed: Oct. 20, 2014

(86) PCT No.: PCT/KR2014/009860
§ 371 (c)(1),
(2) Date: Apr. 12, 2016

(87) PCT Pub. No.: WO2015/057038
PCT Pub. Date: Apr. 23, 2015

(65) Prior Publication Data
US 2016/0261888 A1 Sep. 8, 2016

Related U.S. Application Data

(60) Provisional application No. 61/892,448, filed on Oct. 18, 2013.

(51) Int. Cl.
*H04N 7/12* (2006.01)
*H04N 19/597* (2014.01)
(Continued)

(52) U.S. Cl.
CPC ........... *H04N 19/597* (2014.11); *H04N 19/44* (2014.11); *H04N 19/52* (2014.11); *H04N 19/70* (2014.11)

(58) Field of Classification Search
CPC ................ H04N 19/00; H04N 19/597; H04N 19/00769; H04N 19/46; H04N 13/0048
(Continued)

(56) References Cited

U.S. PATENT DOCUMENTS 9,485,503 B2 * 11/2016 Zhang .................... H04N 19/00
2013/0229485 A1 * 9/2013 Rusanovskyy .... H04N 13/0048
348/43

(Continued)

FOREIGN PATENT DOCUMENTS

KR 10-2005-0066400 A 6/2005
WO 2010/043773 A1 4/2010
WO 2013/115025 A1 8/2013

OTHER PUBLICATIONS

Ismael Daribo et al., "Arbitrarily Shaped Sub-Block Motion Prediction in Textile Map Compression Using Depth Information", IEEE, 2012 Picture Coding Symposium, May 7-9, 2012, Krakow, Poland, pp. 121-124.

(Continued)

*Primary Examiner* — Gims S Philippe
(74) *Attorney, Agent, or Firm* — Dentons US LLP

(57) ABSTRACT

The present invention relates to a video decoding apparatus and a method for decoding a multi-view video, and the video decoding apparatus according to the present invention comprises: an entropy-decoding unit for entropy-decoding a bitstream and outputting video information required for decoding a current block in a depth picture; a memory for saving pictures referenced when decoding the current block; and a prediction unit for inducing a prediction sample of the current block, by using motion information of a texture picture within the same view as motion information of the current block.

8 Claims, 11 Drawing Sheets

(51) Int. Cl.
*H04N 19/44* (2014.01)
*H04N 19/52* (2014.01)
*H04N 19/70* (2014.01)

(58) Field of Classification Search
USPC .................. 348/42, 43; 375/240.01–240.29
See application file for complete search history.

(56) References Cited

U.S. PATENT DOCUMENTS

| | | | |
|---|---|---|---|
| 2013/0342644 A1* | 12/2013 | Rusanovskyy | H04N 19/597 348/43 |
| 2014/0009574 A1* | 1/2014 | Hannuksela | H04N 19/00769 348/42 |
| 2015/0103906 A1* | 4/2015 | Zhao | H04N 19/46 375/240.12 |

OTHER PUBLICATIONS

Jin Young Lee et al., "A Fast and Efficient Multi-View Depth Image Coding Method Based on Temporal and Inter-View Correlations of Texture Images", IEEE Transactions on Circuits and Systems for Video Technology, vol. 21, No. 12, Dec. 2011, pp. 1859-1868.

\* cited by examiner

METHOD AND APPARATUS FOR DECODING MULTI-VIEW VIDEO

This application is a National Stage Application of International Application No. PCT/KR2014/009860, filed on Oct. 20, 2014, which claims the benefit of U.S. Provisional Application No. 61/892,448, filed on Oct. 18, 2013, all of which are hereby incorporated by reference in their entirety for all purposes as if fully set forth herein.

BACKGROUND OF THE INVENTION

Field of the Invention

The present invention relates to a video coding technique, and, more particularly, to a 3D video image coding technique.

Related Art

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, 3D video using multi-views have a high correlation between views having the same picture order count POC. Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for encoding/decoding a multi-view video, and information need for encoding and/or decoding of a current view can be obtained. For example, a block to be decoded in a current view can be predicted or decoded with reference to a block in different view.

SUMMARY OF THE INVENTION

The present invention provides a method and an apparatus for reconstructing information of a current view based on a picture of another view.

The present invention provides a method and an apparatus for inheriting motion information of a texture view to motion information for a current block in a depth view.

The present invention provides a method and an apparatus that derives the motion information of the texture view by the unit of a sub block and uses the derived motion information as the motion information for the current block in the depth view.

The present invention provides a method and an apparatus that derives the motion information of the texture view by the unit of a prediction block or by the unit of a sub prediction block to derive a prediction sample of the current block.

In an aspect, a video decoding apparatus decoding a multi-view video includes: an entropy-decoding unit entropy-decoding a bitstream to output video information required for decoding a current block in a depth picture; a memory storing pictures referenced when decoding the current block; and a prediction unit deriving a prediction sample for the current block by using motion information of a texture picture in the same view as motion information for the current block, wherein the prediction unit decides whether the motion information of the texture picture is derived by the unit of a sub block and derives the motion information for the current block based on the decision.

In another aspect, a video decoding method decoding a multi-view video includes: entropy-decoding a bitstream to derive video information required for decoding a current block in a depth picture; deciding whether motion information for the current block is derived from a texture picture by the unit of a sub block based on the video information; deriving the motion information for the current block from the texture picture according to the decision; and deriving a prediction sample for the current block by using the motion vector.

According to the present invention, motion information of a view is inherited to motion information for a current block in a depth view to effectively code the depth view.

According to the present invention, motion information of a texture view is derived by the unit of a sub block to be used as the motion information for the current block in the depth view.

According to the present invention, the motion information of the texture view is derived by the unit of a prediction block or by the unit of a sub prediction block to be used as the motion information for the current block in the depth view.

DESCRIPTION OF EXEMPLARY EMBODIMENTS

As used herein, a term "Pixel" or "pel" means a minimum unit constituting a single image. A term "Sample" may be used as a term representing a value of a specific pixel. In this connection, the sample may indicate a pixel value of a luma component and/or a pixel value of a chroma component.

As used herein, a term "Unit" means a basic unit for image processing and/or a specific position in an image. The unit may be used interchangeably with terms such as "block", "area", or the like. Generally, a M×N block refers to a set of samples or transform coefficients arranged in M columns and N rows.

Hereinafter, embodiments of the present invention will be described in details with reference to the attached drawings.

Figure 1:
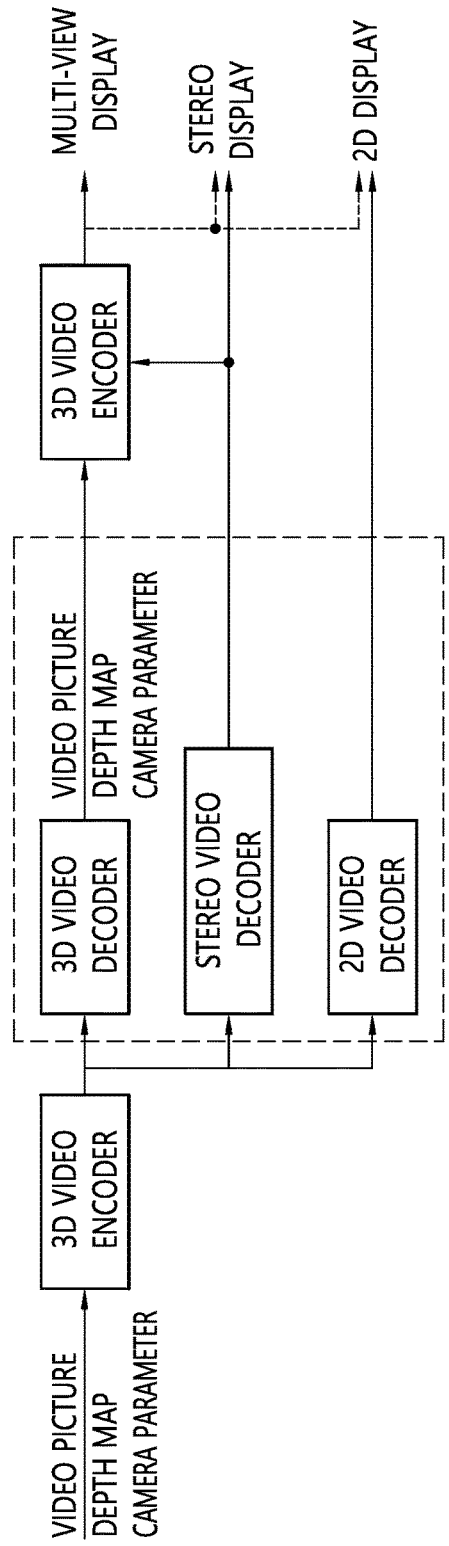
FIG. 1 is a diagram schematically describing encoding and decoding processes of a 3D video.

FIG. 1 is a diagram scheduling describing encoding and decoding processes of a 3D video.

Referring to FIG. 1, a 3 video encoder encodes a video picture and a depth map and a camera parameter to output the same as a bitstream.

The depth map may be constituted by distance information (depth information) between a camera and a subject with respect to a pixel of the corresponding video picture (texture picture). For example, the depth map may be a picture acquired by normalizing the depth information according to a bit depth. In this case, the depth map may be constituted by the depth information recorded without expression of a chrominance.

In general, since a distance from the subject and a disparity are in inverse proportion to each other, disparity information indicating a correlation between views may be induced from the depth information of the depth map by using the camera parameter.

A bitstream including the depth map and camera information together with a general color picture, that is, the video picture (texture picture) may be transmitted to a decoder through a network or a storage medium.

The decoder receives the bitstream to reconstruct the video. When a 3D video decoder is used as the decoder, the 3D video decoder may decode the video picture, and the depth map and the camera parameter from the bitstream. Views required for a multi-view display may be synthesized based on the decoded video picture, depth map, and camera parameter. In this case, when the used display is a stereo display, the 3D picture may be displayed by using two pictures among the reconstructed multi-views.

When the stereo video decoder is used, the stereo video decoder may reconstruct two pictures to be incident in both eyes from the bitstream. The stereo display may display a 3D picture by using a view difference or disparity between a left picture incident in a left eye and a right picture incident in a right eye. When the multi-view display is used together with the stereo video decoder, the multi-views may be displayed by generating other views based on the two reconstructed pictures.

When a 2D decoder is used, a 2D picture is reconstructed to output the picture through a 2D display. The 2D display is used, but when the 3D video decoder or the stereo video decoder is used as the decoder, one of the reconstructed pictures may be output through the 2D display.

In the configuration of FIG. 1, the view synthesis may be performed by the decoder or the display. Further, the decoder and the display may be one apparatus or separate apparatuses.

In FIG. 1, for easy description, it is described that the 3D video decoder, the stereo video decoder, and the 2D video decoder are separate decoders, but one decoding apparatus may perform all 3D video decoding, stereo video decoding, and 2D video decoding. Further, a 3D video decoding apparatus may perform the 3D video decoding, a stereo video decoding apparatus may perform the stereo video decoding, and a 2D video decoding apparatus may perform the 2D video decoding. Furthermore, the multi-view display may output a 2D video or a stereo video.

Figure 2:
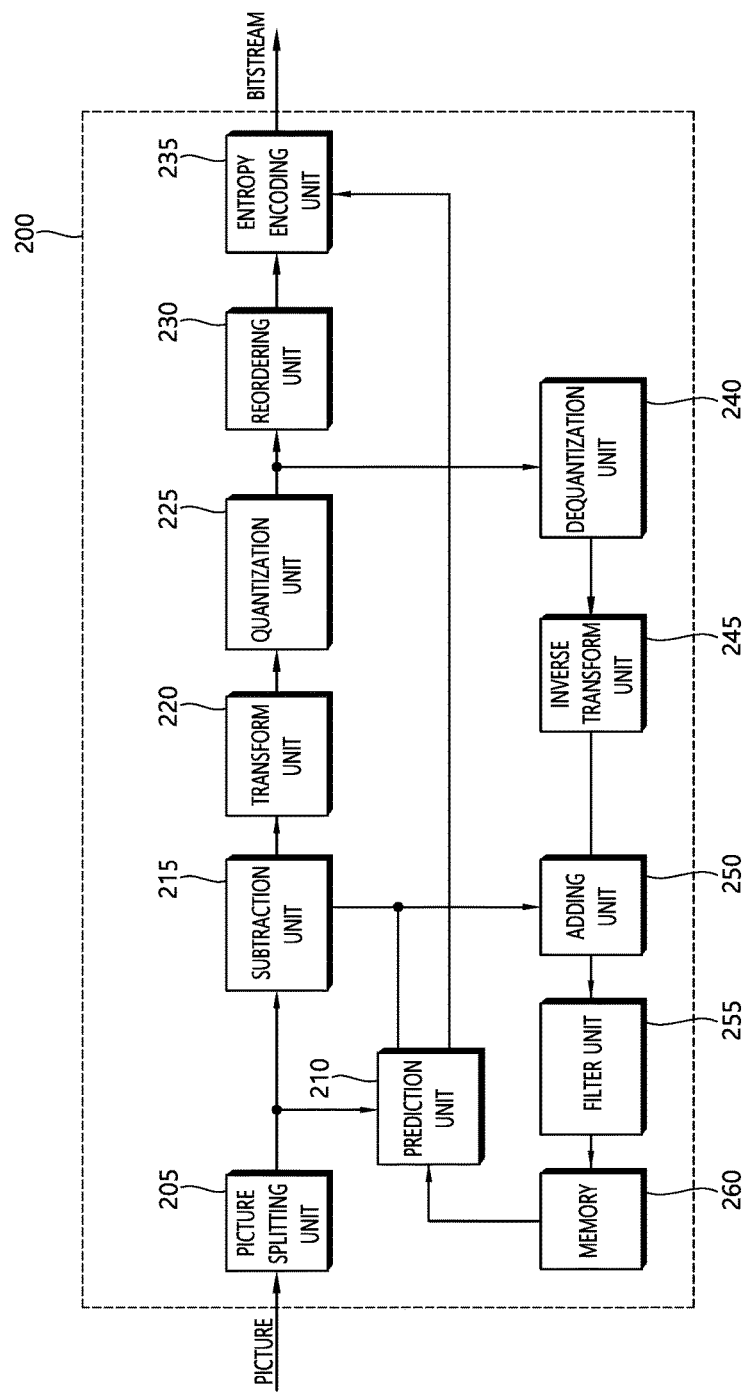
FIG. 2 is a diagram schematically describing a configuration of a video encoding apparatus.

FIG. 2 is a diagram schematically describing a configuration of a video encoding apparatus. Referring to FIG. 2, the video encoding apparatus 200 includes a picture splitting unit 205, a prediction unit 210, a subtraction unit 215, a transform unit 220, a quantization unit 225, a reordering unit 230, an entropy encoding unit 235, a dequantization unit 240, an inverse transform unit 245, an adding unit 250, a filter unit 255, and a memory 260.

The picture splitting unit 05 may split an input picture into at least one processing unit block. In this case, the processing unit block may be a coding unit block, a prediction unit block, or a transform unit block. The coding unit block as a unit block of coding may be split from a maximum coding unit block according to a quad tree structure. The prediction unit block as a block partitioned from the coding unit block may be a unit block of sample prediction. In this case, the prediction unit block may be divided into sub blocks. The transform unit bock as the coding unit block may be split according to the quad tree structure and may be a unit block to induce a transform coefficient or a unit block to induce a residual signal from the transform coefficient.

As used herein, for the sake of convenience of illustration, a coding unit block is referred to as a coding block or a coding unit (CU). A prediction unit block is referred to as a prediction block or a prediction unit (PU). A transform unit block is referred to as a transform block or a transform unit (TU).

The prediction block or the prediction unit may mean a block-shape specific area or an array of the prediction sample. Further, the transformation block or the transform unit may mean the block-shape specific area or an array of the transform coefficient or a residual sample.

The prediction unit 210 may perform a prediction for a processing target block (hereinafter, referred to as a current block) and generate the prediction block including prediction samples for the current block. A unit of the prediction performed by the prediction unit 210 may be the coding block, the transformation block, or the prediction block.

The prediction unit 210 may decide whether an intra prediction is applied to the current block or whether an inter prediction is applied to the current block.

In the case of the intra prediction, the prediction unit 210 may induce the prediction sample for the current block based on a neighbor block pixel in a picture (hereinafter, a current picture) to which the current block belongs. In this case, the prediction unit 210 may (i) induce the prediction sample based an average or an interpolation of neighbor reference samples of the current block or (ii) induce the prediction sample based on a reference sample which is present in a specific direction with respect to a prediction target pixel among neighbor blocks of the current block. For easy description, the case of (i) is referred to as a non-directional mode and the case of (ii) is referred to as a directional mode. The prediction unit 210 may decide a prediction mode applied to the current block by using the prediction mode applied to the neighbor block.

In the case of the inter prediction, the prediction unit 210 may induce the prediction sample for the current block based on samples specified by a motion vector on a collocated picture. The prediction unit 10 applies any one of a skip mode, a merge mode, and an MVP mode to induce the prediction sample for the current block. In the cases of the skip mode and the merge mode, the prediction unit 210 may use motion information of the neighbor block as the motion information of the current block. In the case of the skip mode, a difference (residual) between the prediction sample and an original sample is not transmitted unlike the merge mode. In the case of the MVP mode, the motion vector of the neighbor block is used as a motion vector predictor (MVP) to induce the motion vector of the current block.

In the case of the inter prediction, the neighbor block includes a spatial neighbor block which is present in the current picture and a spatial neighbor block which is present in the collocated picture. The motion information includes the motion vector and the collocated picture. In the skip mode and the merge mode, when the motion information of the spatial neighbor block is used, a highest picture on a collocated picture list may be used as the collocated picture.

In the case of encoding a dependent view, the prediction unit 210 may perform an inter-view prediction.

The prediction unit 210 may configure the collocated picture list including a picture of another view. For the inter-view prediction, the prediction unit 210 may induce a disparity vector. Unlike a motion vector specifying a block corresponding to the current block in another picture in a current view, the disparity vector may specify a block corresponding to the current block in another view of the same access unit as the current picture.

The prediction unit 210 may specify a depth block in a depth view based on the disparity vector and perform a configuration of a merge list, an inter-view motion prediction, an illumination compensation (IC), view synthesis, and the like.

The disparity vector for the current block may be induced from a depth value by using the camera parameter or induced from the motion vector or disparity vector of the neighbor block in the current or another view.

For example, the prediction unit 210 may add to a merge candidate list an inter-view merging candidate (IvMC) corresponding to spatial motion information of a reference view, an inter-view disparity vector candidate (IvDC) corresponding to the disparity vector, a shifted IvMC induced by a shift of the disparity, a texture merging candidate (T) induced from a texture corresponding to a case in which the current block is a block on the depth map, a disparity derived merging candidate (D) derived from the texture merging candidate by using the disparity, a view synthesis prediction merge candidate (VSP) derived based on the view synthesis, and the like.

In this case, the number of candidates included in a merge candidate list applied to the dependent view may be limited to a predetermined value.

Further, the prediction unit 210 may predict the motion vector of the current block based on the disparity vector by applying the inter-view motion vector prediction. In this case, the prediction unit 210 may derive the disparity vector based on conversion of a maximum depth value in the corresponding depth block. When a position of the reference sample in the reference view is specified by adding the disparity vector to a sample position of the current block in the reference view, a block including the reference sample may be used as the reference block. The prediction unit 210 may use the motion vector of the reference block as a candidate motion parameter or a motion vector predictor candidate of the current block and use the disparity vector as a candidate disparity vector for a disparity-compensated prediction (DCP).

The subtraction unit 215 generates the residual sample which is the difference between the original sample and the prediction sample. When the skip mode is applied, the subtraction unit 215 may not generate the residual sample as described above.

The transform unit 210 generates the transform coefficient by using transforming the residual sample by the unit of the transform block. The quantization unit 225 quantizes the transform coefficients to generate quantized transform coefficients.

The reordering unit 230 reorders the quantized transform coefficients. The reordering unit 230 may reorder the block-shape quantized transform coefficients in a 1D vector shape through a scanning method.

The entropy encoding unit 235 may perform entropy-encoding of the quantized transform coefficients. As the entropy encoding, encoding methods including, for example, exponential Golomb, context-adaptive variable length coding (CAVLC), context-adaptive binary arithmetic coding (CABAC), and the like may be used. The entropy encoding unit 235 may encode information (e.g., a value of a syntax element, and the like) required for video reconstruction together or separately in addition to the quantized transform coefficients.

The entropy-encoded information may be transmitted or stored by the unit of a network abstraction layer as the form of the bitstream.

The dequantization unit 240 dequantizes the quantized transform coefficient to generate the transform coefficient. The inverse transform unit 245 inversely transforms the transform coefficient to generate the residual sample.

The adding unit 250 adds the residual sample and the prediction sample to reconstruct the picture. The residual sample and the prediction sample are added to each other by the unit of the block to generate a reconstruction block. Herein, the adding unit 250 is described as a separate component, but the adding unit 250 may be a part of the prediction unit 210.

The filter unit 255 may apply a deblocking filter and/or offset to the reconstructed picture. Distortion during an artifact or a quantization process of a block boundary in the reconstructed picture may be corrected through the deblocking filtering and/or offset. The offset may be applied by the unit of the sample and applied after the process of the deblocking filtering is completed.

The memory 260 may store the reconstructed picture or information required for encoding/decoding. For example, the memory 60 may store pictures used for the inter prediction/inter-view prediction. In this case, the pictures used for the inter prediction/inter-view prediction may be designated by a collocated picture set or a collocated picture list.

Herein, it is described that one encoding apparatus encodes an independent view or the dependent view, but this is for easy description and a separate encoding apparatus is configured for each view or a separate internal module (for example, a prediction unit for each view) may be configured for each view.

Figure 3:
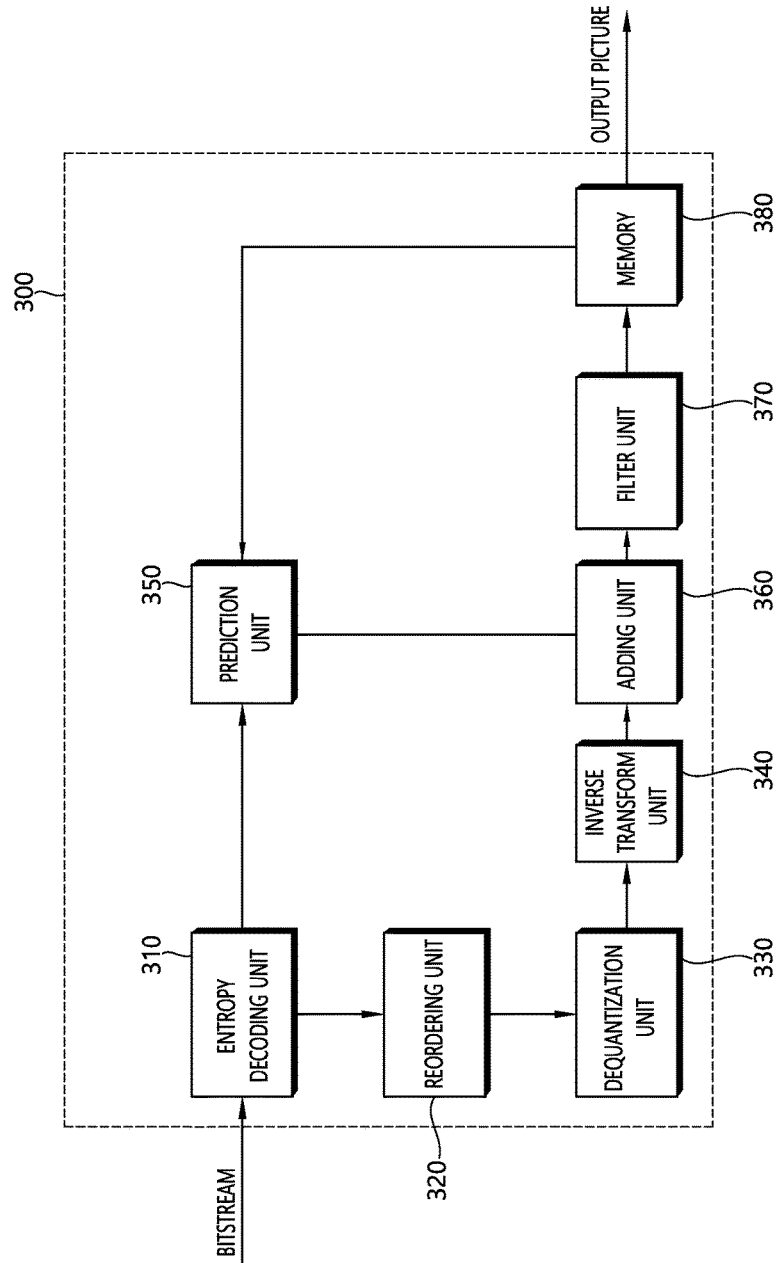
FIG. 3 is a diagram schematically describing a configuration of a video decoding apparatus.

FIG. 3 is a diagram schematically describing a configuration of a video decoding apparatus. Referring to FIG. 3, the video decoding apparatus 300 includes an entropy decoding unit 310, a reordering unit 320, a dequantization unit 330, an inverse transform unit 340, a prediction unit 350, an adding unit 360, a filter unit 370, and a memory 380.

When a bitstream including video information is input, the video decoding apparatus 300 may reconstruct a video to correspond to a process in which the video information is processed by the video encoding apparatus.

For example, the video decoding apparatus 300 may perform video decoding by using the processing unit applied in the video encoding apparatus. In this case, the processing unit block of the video decoding may be the coding unit block, the prediction unit block, or the transform unit block. The coding unit block as a unit block of decoding may be split from the maximum coding unit block according to the quad tree structure. The prediction unit block as the block partitioned from the coding unit block may be the unit block of sample prediction. In this case, the prediction unit block may be divided into sub blocks. The transform unit bock as the coding unit block may be split according to the quad tree structure and may be a unit block to derive a transform coefficient or a unit block to derive a residual signal from the transform coefficient.

The entropy decoding module 310 may parse a bitstream and output information required to recover a video or picture. For example, the entropy decoding module 310 may decode information in the bitstream based on an expotential-Golomb, CAVLC, CABAC, etc., and output a syntax element value for video recovery, a quantized value of a transform coefficient for a residual.

When a plurality of views is processed in order to reproduce the 3D video, the bitstream may be input for each view. Alternatively, information on the respective views may be multiplexed in the bitstream. In this case, the entropy decoding unit 310 de-multiplexes the bitstream to parse the de-multiplexed bitstream for each view.

The reordering unit 320 may reorder the quantized transform coefficients in the 2D block form. The reordering unit 320 may perform reordering to correspond to coefficient scanning performed by the encoding apparatus.

The dequantization unit 330 dequantizes the quantized transform coefficients based on (de)quantized parameters to output the transform coefficients. Information for deriving the quantized parameters may be signaled from the encoding apparatus.

The inverse transform unit 340 inversely transforms the transform coefficients to derive the residual samples.

The prediction unit 350 may perform a prediction for the current block and generate the prediction block including prediction samples for the current block. A unit of the prediction performed by the prediction unit 350 may be the coding block, the transformation block, or the prediction block.

The prediction unit 350 may decide whether the intra prediction is applied to the current block or whether the inter prediction is applied to the current block. In this case, a unit for deciding which the intra prediction or the inter prediction is applied and a unit for generating the prediction sample may be different from each other. Moreover, the units for generating the prediction sample in the inter prediction and the intra prediction may also be different from each other.

In the case of the intra prediction, the prediction unit 350 may derive the prediction sample for the current block based on the neighbor block pixel in the current picture. The prediction unit 350 may derive the prediction sample for the current block by applying the directional mode or the non-directional mode based on neighbor reference blocks of the current block. In this case, the prediction mode to be applied to the current block may be decided by using an intra prediction mode of the neighbor block.

In the case of the inter prediction, the prediction unit 350 may derive the prediction sample for the current block based on the samples specified by the motion vector on the collocated picture. The prediction unit 10 applies any one of the skip mode, the merge mode, and the MVP mode to derive the prediction sample for the current block.

In the cases of the skip mode and the merge mode, the prediction unit 350 may use the motion information of the neighbor block as the motion information of the current block. In this case, the neighbor block may include a spatial neighbor block and a temporal neighbor block.

The prediction unit 350 may configure the merge candidate list as motion information of an available neighbor block and information indicated by a merge index on the merge candidate list may be used as the motion vector of the current block. The merge index may be signaled from the encoding apparatus. The motion information includes the motion vector and the collocated picture. In the skip mode and the merge mode, when the motion information of the temporal neighbor block is used, the highest picture on the collocated picture list may be used as the collocated picture.

In the case of the skip mode, the difference (residual) between the prediction sample and the original sample is not transmitted unlike the merge mode.

In the case of the MVP mode, the motion vector of the neighbor block is used as the motion vector predictor (MVP) to derive the motion vector of the current block. In this case, the neighbor block may include the spatial neighbor block and the temporal neighbor block.

In the case of encoding the dependent view, the prediction unit 350 may perform the inter-view prediction. In this case, the prediction unit 350 may configure the collocated picture list including the picture of another view.

For the inter-view prediction, the prediction unit 350 may derive the disparity vector. The prediction unit 350 may specify the depth block in the depth view based on the disparity vector and perform the configuration of the merge list, the inter-view motion prediction, the illumination compensation (IC), the view synthesis, and the like.

The disparity vector for the current block may be derived from the depth value by using the camera parameter or derived from the motion vector or disparity vector of the neighbor block in the current or another view. The camera parameter may be signaled from the encoding apparatus.

When the merge mode is applied to the current block of the dependent view, the prediction unit 350 may add to the merge candidate list IvDC corresponding to the temporal motion information of the reference view, IvDC corresponding to the disparity vector, shift IvMC derived by the shift of the disparity vector, the texture merge candidate (T), derived from the texture corresponding to the case in which the current block is the block on the depth map, the disparity derive merge candidate (D) derived from the texture merge candidate by using the disparity, the view synthesis prediction merge candidate (VSP) derived based on the view synthesis, and the like.

In this case, the number of candidates included in the merge candidate list applied to the dependent view may be limited to a predetermined value.

Further, the prediction unit 350 may predict the motion vector of the current block based on the disparity vector by applying the inter-view motion vector prediction. In this case, the prediction unit 350 may use the block in the reference view specified by the disparity vector as the reference block. The prediction unit 350 may use the motion vector of the reference block as the candidate motion parameter or the motion vector predictor candidate of the current block and use the disparity vector as the candidate disparity vector for the DCP.

The adding unit 360 adds the residual sample and the prediction sample to reconstruct the current block or the current picture. The adding unit 360 adds the residual sample and the prediction sample by the unit of the block to reconstruct the current picture. When the skip mode is applied, since the residual is not transmitted, the prediction sample may become a reconstruction sample. Herein, the adding unit 360 is described as a separate component, but the adding unit 360 may be a part of the prediction unit 350.

The filter unit 370 may apply the deblocking filtering and/or offset to the reconstructed picture. In this case, the offset may be adaptively applied as the offset of the sample unit.

The memory 380 may store the reconstructed picture or information required for decoding. For example, the memory 380 may store pictures used for the inter prediction/inter-view prediction. In this case, the pictures used for the inter prediction/inter-view prediction may be designated by the collocated picture set or the collocated picture list. The reconstructed picture may be used as the collocated picture.

Further, the memory 380 may output the reconstructed pictures according to an output order. In order to reproduce the 3D picture, although not illustrated, an output unit may display a plurality of different views.

In the example of FIG. 3, it is described that one decoding apparatus decodes the independent view and the dependent view, but this is for easy description and the present invention is not limited thereto. For example, each decoding apparatus may operate for each view and one decoding apparatus may include an operating unit (for example, a prediction unit) corresponding to each view therein.

When coding a multi-view video, encoding and decoding devices may improve efficiency of video coding for a current view, using coded data for different view belonging to the same access unit (AU) as a current picture. In this connection, pictures having an equal POC (Picture Order Count) may define a single AU. The POC refers to a display order of a certain picture.

The encoding and decoding devices may code views on an AU unit basis, and/or may code pictures on a view unit basis. The coding may proceed for the views based on a predetermined order. A view to be coded first may be referred to as a base view or independent view. A view to be coded with reference to different view after coding the independent view may be referred to as a dependent view. Further, when a current view is a dependent view, different view to be referenced for coding (encoding/decoding) of the current may be referred to as a reference view.

Figure 4:
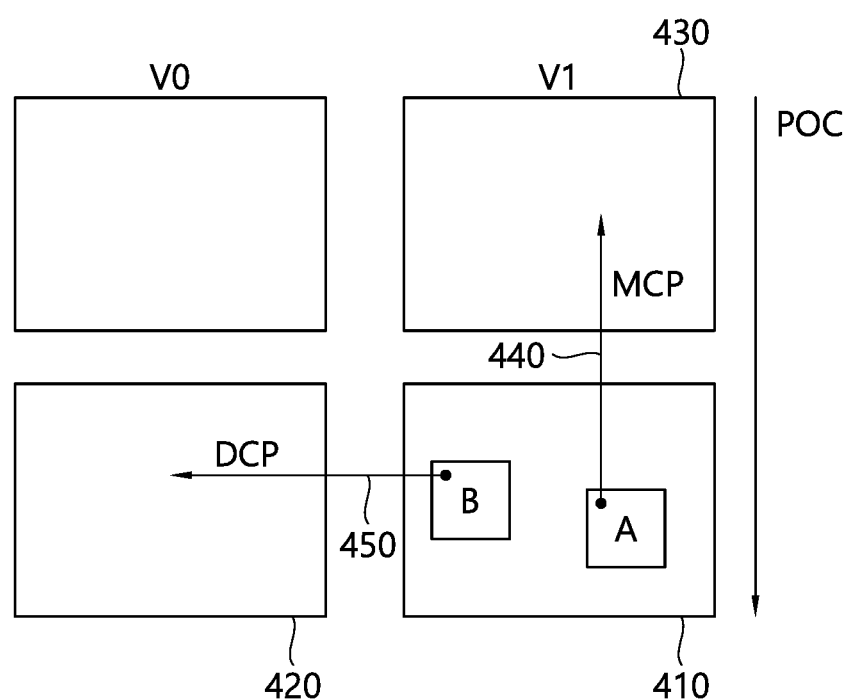
FIG. 4 is a diagram schematically describing inter-view coding.

FIG. 4 schematically illustrates an inter-view coding method. In an example of FIG. 4, coding is performed on an AU unit basis, and V0 is an independent view, and V1 is a dependent view. Inter picture prediction may be carried out, for example, for a block A in a current picture 410 with reference to another picture 430 in the same view as the current picture 410 by using a motion vector. Such inter picture prediction may be referred to as motion-compensated prediction (MCP). In an alternative, inter picture prediction may be carried out, for example, for a block B in the current picture 410 with reference to a picture 420 in a different view from the current picture 410 but existing in the same access unit, that is, having the same POC as the current picture 410 by using a disparity vector. Such inter picture prediction may be referred to as disparity-compensated prediction (DCP).

When coding a multi-view video, the inter picture prediction may employ a depth map besides the picture in the different view from the current view containing the current block.

Figure 5:
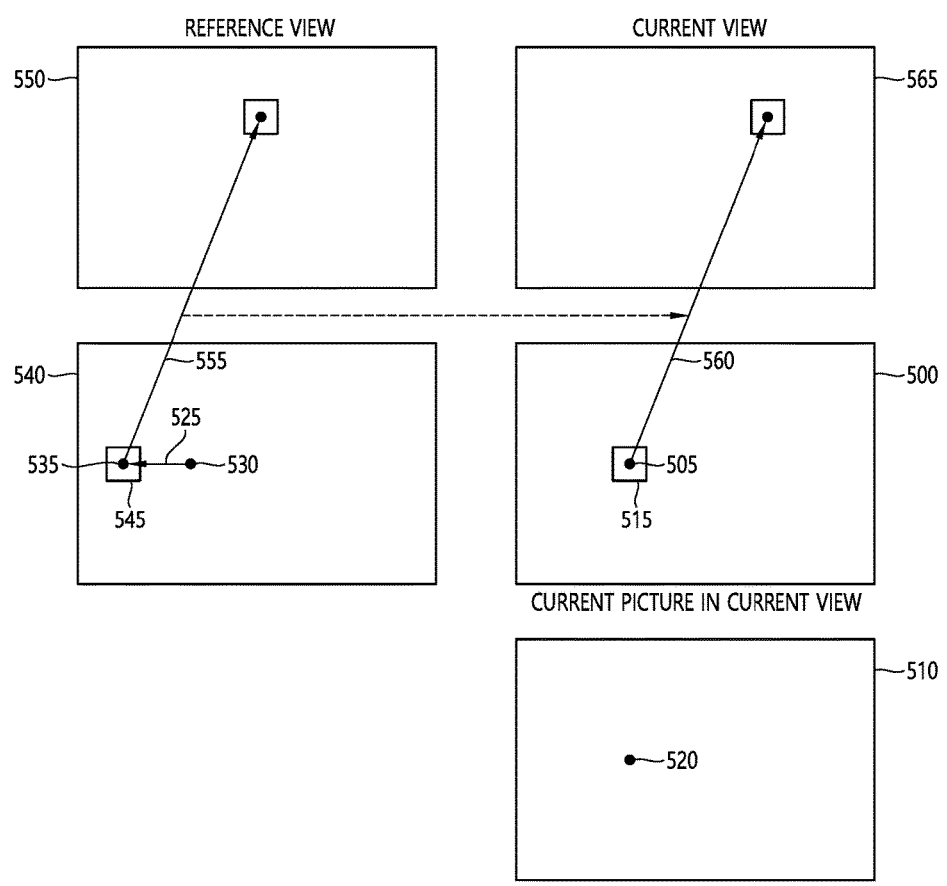
FIG. 5 schematically describes a multi-view coding method using a depth map.

FIG. 5 schematically illustrates a multi-view coding method using a depth.

Referring to FIG. 5, a block (current block 505) in a current picture 500 in a current view may be coded (encoded/decoded) using a depth map 510. In this connection, a depth value d for a position (x, y) of a sample 520 in the depth map 510 corresponding to a position (x, y) of a sample 515 in the current block 505 may be transformed to a disparity vector 525. The depth value d may be derived based on a distance between the sample pixel and a camera.

Encoding and decoding devices may add a disparity vector 525 to the position (x, y) of the sample 530, thereby to determine a position of a reference sample 535 in a current picture 540 in a reference view. The disparity vector may have only a x axial component. Therefore, the disparity vector value may be a value (disp, 0). Thus, the position (xr, y) of the reference sample 540 may be determined to be a position (x+disp, y).

Encoding and decoding devices may employ a motion parameter for the reference block 545 including a reference pixel 535 as a candidate motion parameter for the current block. For example, when a reference picture 550 in the reference view is a reference picture for the reference block 545, the motion vector 555 for the reference block 545 may be derived from a motion vector 560 for the current block 505. In this connection, a picture 565 may be a reference picture in the current view.

Meanwhile, as described above, in decoding the multi-view video, information of another view may be referred by using a disparity vector.

In the case of coding (encoding/decoding) a picture of a dependent view, when there is a DCP-coded block among neighbor blocks which have been coded, the disparity vector of the DCP coding block may be used as a disparity vector to be applied to the current block. In this case, the disparity vector derived from the neighbor block, that is, the disparity vector of the DCP coded block may be used as disparity vectors for applying an inter-view motion prediction (IVMP) and an inter-view residual prediction (IVRP) to the current block.

A case in which the motion vector of the current block is determined by the IVMP will be first described. In a motion vector prediction (MVP) or an advanced motion prediction (AMVP) mode, a merge mode or a skip mode, when a candidate derived from a motion vector of a corresponding block in an inter-view reference picture is selected as the motion vector applied to the current block, the current block is coded by an MCP.

A block in which the motion vector is predicted by the IVMP method among blocks coded by the MCP is referred to as a DV-MCP block.

Figure 6:
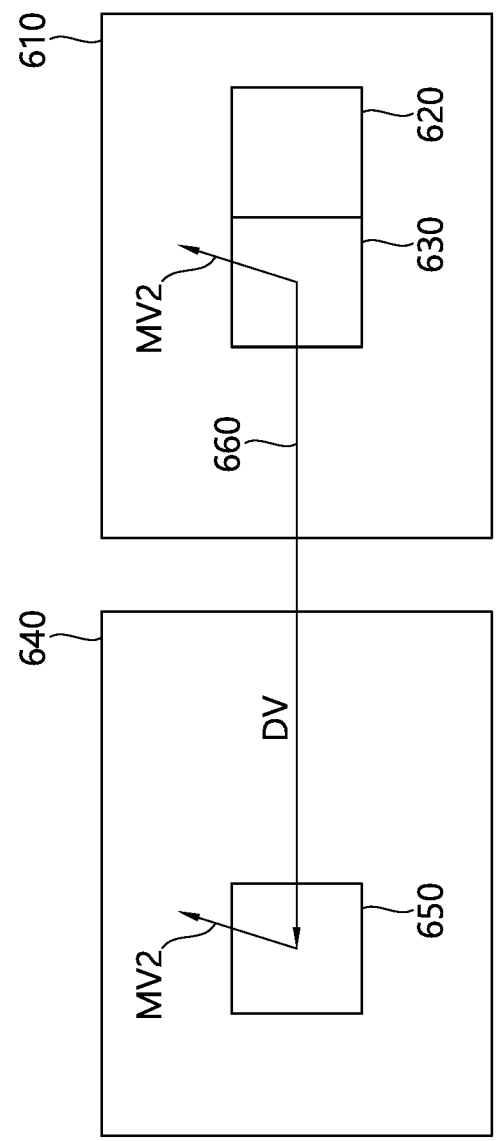
FIG. 6 is a diagram schematically describing a DV-MCP block.

FIG. 6 is a diagram schematically describing a DV-MCP block. In FIG. 6, a case in which a current block 620 in a current picture 610 of a current view is inter-predicted is illustrated.

Referring to FIG. 6, a motion vector MV1 of a neighbor block 630 used for the inter-prediction of the current block 620 is derived from a corresponding block 650 of a reference picture 640 in a base view. In this case, the corresponding block is specified by a disparity vector DV 660. As a candidate block used for the inter-prediction of the current block 630, the motion vector MV1 of the neighbor block 630 may be set as a motion vector MV2 of the corresponding block 650 or derived from the MV2.

In this case, POCs of the reference picture 640 in the base view and the current picture 610 may be the same as each other. The neighbor block 630 to which the motion vector MV1 predicted form the motion vector MV2 of the corresponding block 650 in another view is applied may be referred to as the DV-MCP block.

The encoding apparatus and the decoding apparatus may store information of the disparity vector used for predicting the motion vector of the DV-MCP block and use the stored information in a process of deriving the disparity vector of the neighbor block.

Figure 7:
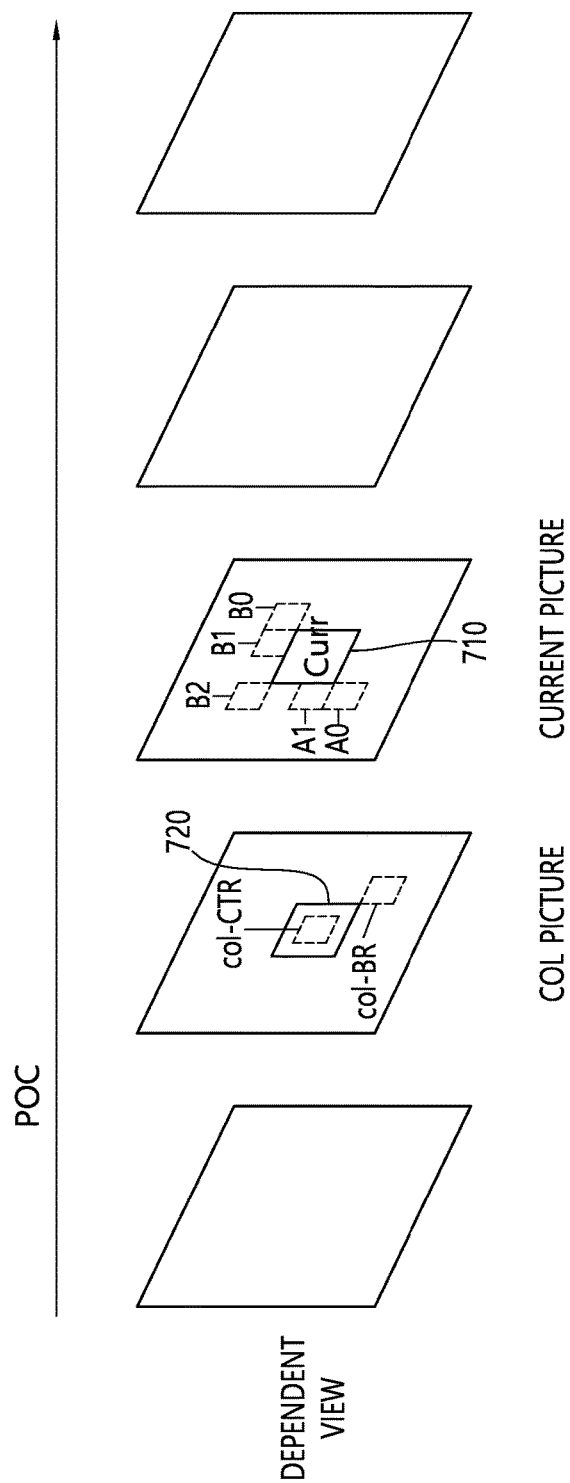
FIG. 7 is a diagram schematically describing one example of neighbor blocks of a current block.

FIG. 7 is a diagram schematically describing one example of neighbor blocks of a current block. The neighbor blocks of FIG. 7 are blocks which have been decoded and are accessible at the time of decoding the current block.

The neighbor blocks of the current block 710 include spatial neighbor blocks A0, A1, B0, B1, and B2 and temporal neighbor blocks col-CTR (col-center), and col-RB (col-right bottom). Positions of the respective spatial neighbor blocks are specified based on the potion of the current block 710.

Further, positions of the respective temporal neighbor blocks are specified based a position 720 corresponding to the current block in a collocated picture which is one of reference pictures. In the case of the temporal neighbor block, in a collocated picture designated at the time of decoding the current picture or a current slice, a coding block including a pixel positioned at the center of the current block 720 becomes col-CTR. Further, when a right-bottom pixel position of the current block 720 in the collocated picture is (x,y), a coding block including a pixel at a position of (x+1, y+1) becomes col-RB. Hereinafter, in the present specification, for easy description, the col-CTR may be expressed as CTR and the col-BR may be expressed as BR.

In the collocated picture, one of temporal reference pictures included in a reference picture list of the current picture or the current slice may be selected for a temporal disparity vector derivation.

The collocated picture may be known to the decoder through a slice header. For example, information indicating which picture is to be used as the collocated picture may be signaled in the slice header.

Meanwhile, in the case where the current block is reconstructed by using the inter-view prediction, when the merge mode is applied to the current block, the prediction sample may be derived by the unit of the prediction block (e.g., PU) or by the unit of the sub-prediction block (e.g., sub-PU).

For example, when a prediction unit of the encoding apparatus and the decoding apparatus is present in a texture and at least one inter-view reference block is present in a current slice, a block corresponding to the current block may be specified based on the disparity vector and the prediction sample may be derived at a PU level or sub PU level by using the corresponding block.

When a prediction using the merge mode is applied to the current block in decoding the multi-view video, the prediction unit of the encoding apparatus and the decoding apparatus may configure a merge candidate list by the same method as the base view and thereafter, add to the merge candidate list an inter-view merge candidate (IvMC) using the motion vector of the corresponding block in the reference view, an inter-view disparity vector candidate (IvDC), a shifted IvMC and a shifted IvDC acquired by shifting the IvMC and the IvDC, and a view synthesis prediction (VSP) merge candidate derived based on a depth.

Hereinafter, merge candidates constituting the merge candidate list will be schematically described.

First, the motion vector usable from the spatial neighbor blocks is derived similarly to the merge candidate list used in the base view. In this case, the spatial neighbor blocks of the current block become the neighbor blocks A0, A1, B0, B1, and B2 of the current block 710 illustrated in FIG. 7.

Further, information of a corresponding block in a reference view other than the current view may be used as the merge candidate of the current block. The corresponding block may be specified by the disparity vector. The disparity vector may be derived from the disparity vector or motion vector of the neighbor block to which the DCP or MCP is applied and a value acquired by modifying the derived motion vector by using the depth map may be used as the disparity vector. For easy description, the disparity vector derived from the neighbor block is referred to as disparity vector from neighbouring blocks and a disparity vector derived from an NBDV by using a depth value is referred to as a depth oriented NBDV (DoNBDV).

The prediction unit of the encoding apparatus and the decoding apparatus may use a motion vector used when the reference block specified by the disparity vector performs a temporal motion compensation in the reference view as the inter-view merge candidate (IvMC). That is, in the reference view, the motion vector of the block to which the MCP is applied may be used as the motion vector candidate of the current block. In this case, as the disparity vector used to specify the reference block, the NBDV or DoNBDV derived based on the current block may be used and a value derived based on the depth map may be used. Meanwhile, in order to derive the IvMC, a derivation method at the PU level or sub PU level may be used.

Further, the prediction unit of the encoding apparatus and the decoding apparatus may use the disparity vector of the corresponding block in the reference view as the inter-view disparity vector candidate (IvDC).

The prediction unit of the encoding apparatus and the decoding apparatus may shift the disparity vector by a specific value and thereafter, derive a motion vector of a corresponding block specified by the shifted disparity vector to the shifted IvMC (IvMCShift). The prediction unit may shift the disparity vector by using a height and a width of the current prediction block. For example, the prediction unit shifts the disparity vector by nPbW*2+2 in an x-axis direction and shifts the disparity vector by nPbH*2+2 in a y-axis direction to derive the IvMCShift when a height of the current block is nPbH and a width of the current block is nPbW. The prediction unit may add the IvMCShift as the merge candidate of the current block when the IvMC and the IvMCShift are not the same as each other.

The prediction unit of the encoding apparatus and the decoding apparatus may shift the disparity vector by a specific value and thereafter, add the shifted disparity vector (IvDCShift) to the merge candidate of the current block. For example, the prediction unit may use a disparity vector acquired by shifting the IvDC only on an x axis by a predetermined distance (e.g., 4) as the IvDCShift. Further, the prediction unit may derive the IvDCShift by considering a case in which a view synthesis prediction is applied. For example, the prediction unit may set a y component of the IvDCShift as 0 when the view synthesis prediction may be performed.

Meanwhile, the prediction unit of the encoding apparatus and the decoding apparatus may derive a candidate based on information of the depth information when the motion vector is added to the merge candidate list based on the inter-view prediction.

For example, the prediction unit may apply a motion parameter inheritance method (MPI) used with motion information from a video signal based on a similarity between the video signal and a depth signal. In this case, different motion vectors may be inherited from the texture for each of sub Pus divided from one depth PU. When the current block is a block of the depth map and is applied with the MPI, the prediction unit may add a merge candidate T using the motion vector inherited from the texture and a depth candidate D derived based on the T as the merge candidate. When the D is used, the prediction samples may be set to a depth value derived from the corresponding disparity vector.

Last, the prediction unit of the encoding apparatus and the decoding apparatus may add the disparity vector by the view synthesis prediction (VSP) as the merge candidate (VSP). The prediction unit may add the disparity vector of the neighbor block as the merge candidate for the current block and derive the depth information of the current block based on the depth value of the corresponding block specified on the depth map by using the disparity vector.

The prediction unit of the encoding apparatus and the decoding apparatus may configure the merge candidate list as follows by using the merge candidates. The merge candidates are positioned on the merge candidate list according to the following order.

(1) The prediction unit adds to the merge candidate list the T and the D as MPI candidates. In detail, the prediction unit determines whether the T is available to add the T when the T is available. The prediction unit determines whether the D is available to add the D next to the T when the D is available.

(2) When the T is not available or the T and the IvMC are different from each other as a case in which the IvMC is available, the prediction unit inserts the IvMC into a position next to the D of the merge candidate list.

(3) When A1 is available, the prediction unit adds the A1 to the merge candidate list. In order to prevent duplication of the merge candidate, the prediction unit may compare sameness between an already added merge candidate and the A1. The already added merge candidate N may be the T when the depth is available and the IvMC when the depth is not available. The prediction unit may exclude the A1 from the merge candidate when the A1 and the N are the same as each other.

(4) When B1 is available, the prediction unit adds the B1 to the merge candidate list. In order to prevent the duplication of the merge candidate, the prediction unit may exclude the B1 from the merge candidate when the B1 and a previously added candidate are the same as each other.

(5) When B0 is available, the prediction unit adds the B0 to the merge candidate list.

(6) When the IvDC is available, the prediction unit adds the IvDC to the merge candidate list. However, the prediction unit may add the IvMC to the merge candidate list (i) when the A1 is not available or the A1 and the IvDC are different from each other, (ii) when the B1 is not available or the B1 and the IvDC are different from each other, and (iii) when the number of merge candidates added up to now is not more than the maximum number of candidates of the merge candidate list.

(7) The prediction unit may add the VSP to the merge candidate list when the disparity vector (hereinafter, referred to as VSP) derived to the VSP and the number of merge candidates added up to now is not more than the maximum number of candidates of the merge candidate list. In this case, the prediction unit may add the VSP to the merge candidate list under a condition that additional coding methods, e.g., an illumination compensation (IC), an advanced residual prediction (ARP), and the like are not available in order to increase coding efficiency.

(8) When A0 is available and the number of merge candidates added up to now is not more than the maximum number of candidates of the merge candidate list, the prediction may add the A0 to the merge candidate list.

(9) When B2 is available and the number of merge candidates added up to now is not more than the maximum number of candidates of the merge candidate list, the prediction may add the B2 to the merge candidate list.

(10) The prediction unit may add the IvMCShift to the merge candidate list (i) when the IvMCShift is available and the number of merge candidates added up to now is not more than the maximum number of candidates of the merge candidate list and (ii) when the IvMC is not available or the IvMC and the IvMCShift are not the same as each other.

(11) When the IvDCShift is available and the number of merge candidates added up to now is not more than the maximum number of candidates of the merge candidate list, the prediction may add the IvDCShift to the merge candidate list.

As described above, when a sample to be predicted through the merge mode is associated with the depth, the candidates T and D by the MPI are used and if not, the T and the D may not be used.

Meanwhile, when the block is not partitioned based on the depth as a case in which the IvMC is used or the VSP may be applied, the prediction unit of the encoding apparatus and the decoding apparatus may specify the motion vector by the unit of the sub block (sub prediction block) of the prediction block.

For example, when the MPI may be applied, an inter-layer (inter-view) prediction may be performed by the unit of the sub-prediction block. Further, even when the view synthesis prediction is performed, the prediction unit may derive the disparity vector by the unit of the sub-prediction block.

As the merge candidate of the inter-view prediction, when the motion vector is derived by the unit of the sub-prediction block, the motion vector may be derived by the unit of the sub-block in the current prediction block.

When the motion vector may be specified by the unit of the sub-prediction block, information for specifying a size of the sub-prediction block may be transmitted at an extension level of a video parameter set. Further, the size of the sub-prediction block when the MPI is applied may be separately signaled.

In detail, in coding the 3D video including the depth picture, the depth map may be coded by referring to coding information regarding a texture picture of the same time, for example, a picture order count (POC).

Since the depth picture is photographed simultaneously with the texture picture of the same time or generated from depth information regarding the texture picture of the same time, a correlation of the depth picture and the texture picture of the same time is very high.

Therefore, in coding the depth picture, block partition information or motion information of the already coded texture picture may be used. As described above, this is referred to the motion parameter inheritance (MPI).

Figure 8:
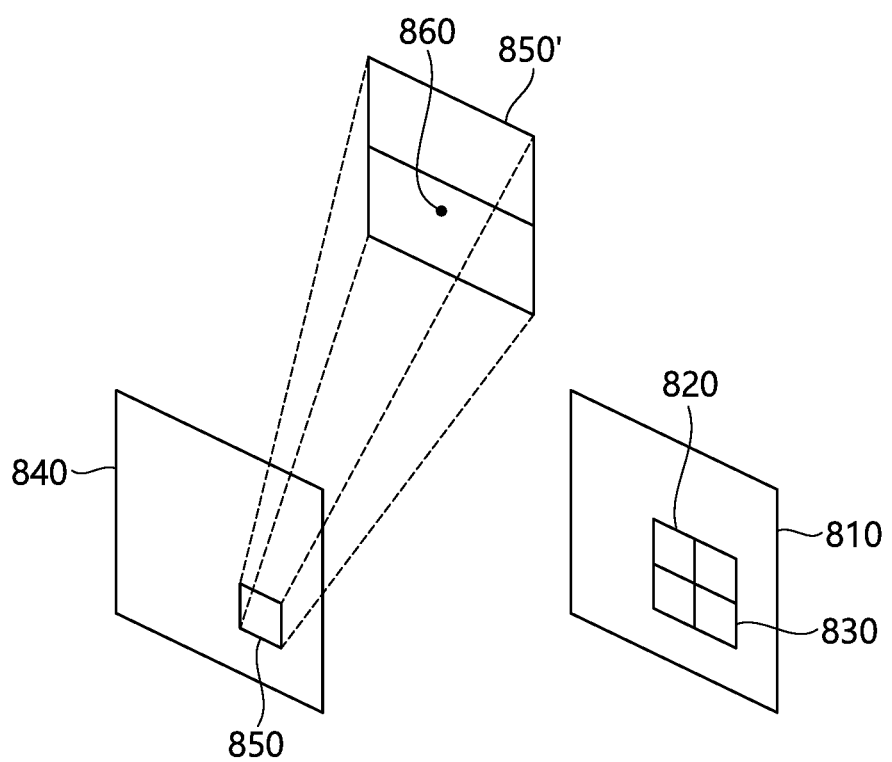
FIG. 8 is a diagram schematically describing a method for deriving information from a texture picture.

FIG. 8 is a diagram schematically describing a method for deriving information from a texture picture.

Referring to FIG. 8, a block 850 in a texture picture 840, which corresponds to a sub block 830 of a prediction block 820 in a current picture 810 is specified. In this case, the current picture 810 may be the depth picture.

Motion information of the prediction including a center 860 of the corresponding texture block 850 may be used as motion information of the sub block 830. For example, when there are two prediction blocks covering the corresponding block 850, motion information of a prediction block 850' including the center 860 may be used as the motion information of the sub block 830.

As one of methods for inheriting a motion parameter from the texture picture, the motion vector inheritance (MVI) may be used.

Figure 9:
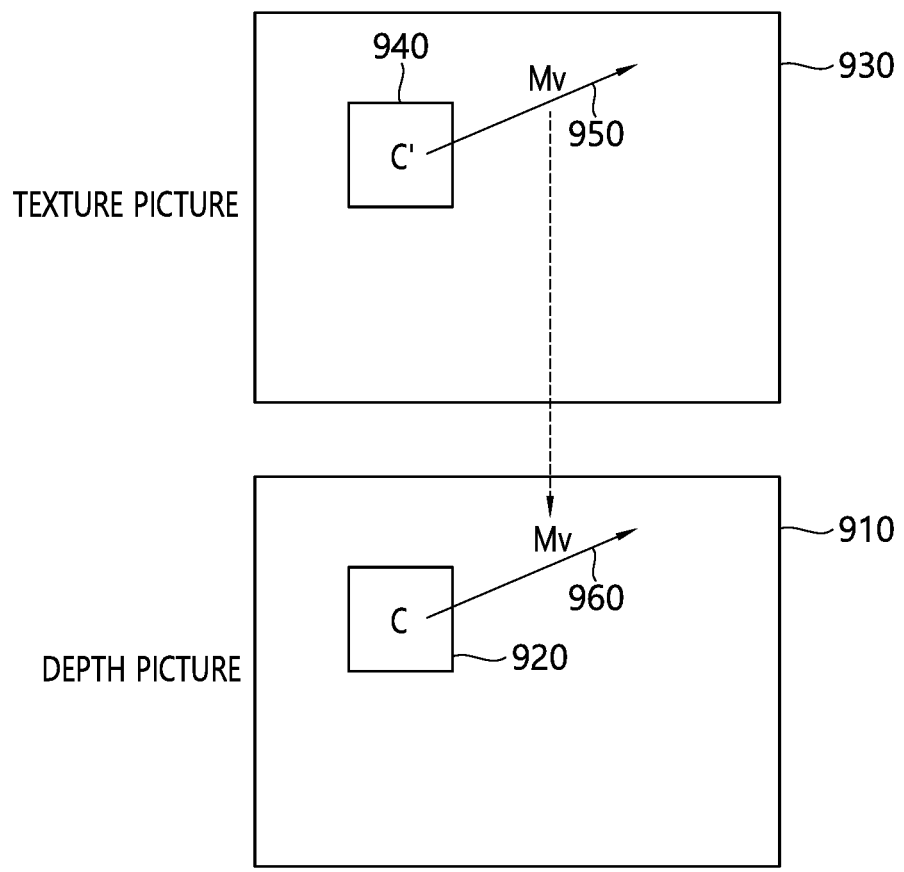
FIG. 9 is a diagram schematically describing a process for deriving a motion vector of a texture picture through an MVI.

FIG. 9 is a diagram schematically describing a process for deriving a motion vector of a texture picture through an MVI.

Referring to FIG. 9, the motion vector may be inherited from a corresponding block C' 940 in a texture picture 930 positioned at the same location as a current block C 920 in a depth picture 910. For example, the prediction unit of the encoding apparatus and the decoding apparatus derives a motion vector Mv 950 at a center of the corresponding block C' 940 to use a motion vector Mv 960 for the current block 920. In this case, when the texture block 940 positioned at the same location as the current block C 920 is a block to which an intra-prediction is applied, the prediction unit does not bring the motion vector from the texture block.

FIG. 9 illustrates a method that derives the motion information at the center of the texture block to apply the derived motion information to the current block of the depth picture. In this regard, the motion vector is brought from the texture picture corresponding to the current block by the unit of the sub block to increase accuracy of the prediction for the current block.

For example, the prediction unit of the encoding apparatus and the decoding apparatus partitions the corresponding block in the texture picture into sub blocks and brings the motion information by the unit of the partitioned sub block to apply the motion information to the current block in the depth picture. In this case, the corresponding block may be the prediction block and the sub block may be the sub prediction block or the sub PU.

Figure 10:
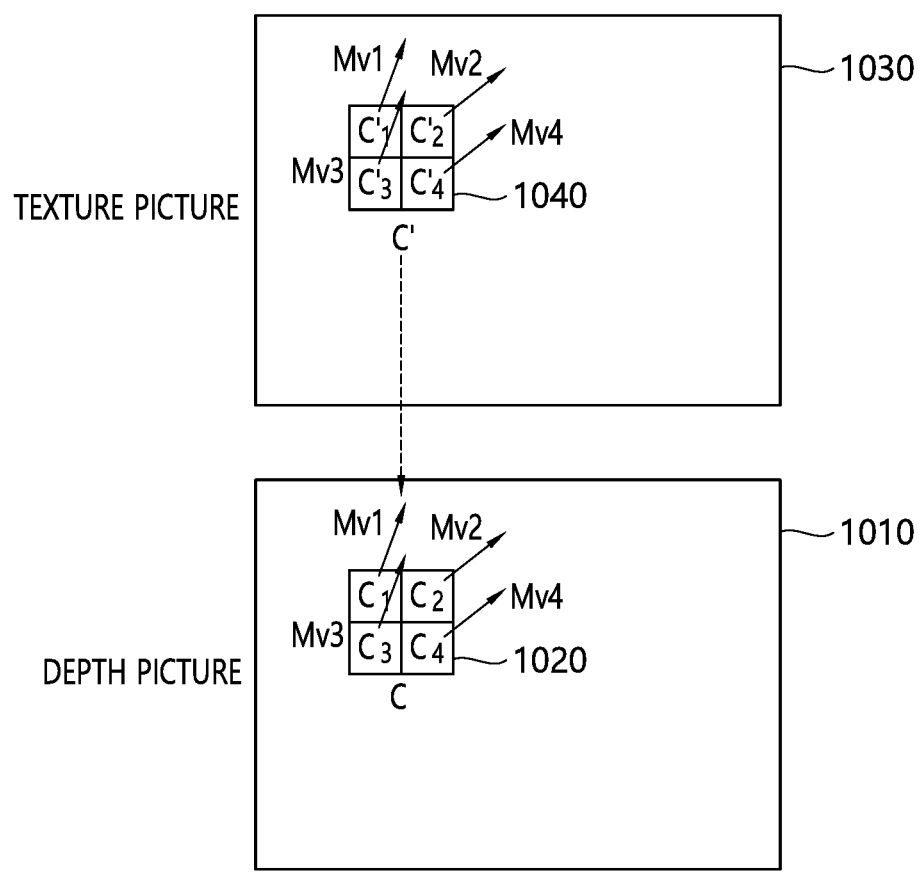
FIG. 10 is a diagram schematically describing a method for deriving the motion vector by applying the MVI by the unit of a sub block.

FIG. 10 is a diagram schematically describing a method for deriving the motion vector by applying the MVI by the unit of a sub block.

In an example of FIG. 10, a method for deriving the motion vector of the depth picture from the texture picture by the unit of the sub prediction block (sub PU) is described.

Referring to FIG. 10, a motion vector of a current block C 1020 in a depth picture 1010 may be inherited from a corresponding block C' 1040 in a texture picture 1030. In this case, the motion vector may be inherited by the unit of the sub block in the current block C 1020 and the corresponding block C' 1040.

When the current block C 1020 is the prediction block, sub blocks C1 to C4 and C'1 to C'4 become the sub prediction blocks. The size of the sub prediction block (sub PU) may be set as N×M (N and M are integers more than 0).

The prediction unit of the encoding apparatus and the decoding apparatus may originally bright the motion vector based on a sub block by a corresponding relationship with the current block C 1020 which is the depth block regardless of block partitioning information in the text picture. For example, the prediction unit may bright the motion vector according to the sizes of sub blocks C1' to C4' of the corresponding block C' 1040.

A position in the sub PU where the motion information is brought may be the center of the sub PU. Alternatively, the position in the sub PU where the motion information is brought may be a left-top position of the sub prediction block. Each sub prediction block may be specified by the left-top position.

When the motion vector is not present in a specific sub PU, the prediction unit may substitute the motion vector of the corresponding sub PU with a neighbor motion vector value. In this case, a neighbor motion vector may be a motion vector of a left or top sub PU of the corresponding sub PU.

Alternatively, the prediction unit of the encoding apparatus and the decoding apparatus may set a predetermined substitution motion vector as the motion vector of the corresponding sub PU when the motion vector is not present in the specific sub PU. In this case, the substitution motion vector may be a motion vector of a block indicated by the NBDV or DoNBDV. Alternatively, the prediction unit may set a previously derived motion vector as the substitution motion vector and continuously update the substitution motion vector.

The prediction unit may decide by which unit of the prediction block (that is, PU unit) or the sub prediction block (that is, sub PU unit) to inherit the motion vector from the texture block corresponding to the depth block at the time of inheriting the motion vector from the texture block corresponding to the depth block.

For example, information indicating whether the motion vector is inherited by the unit of the PU or whether the motion vector is inherited by the unit of the sub PU may be transmitted from the encoding apparatus to the decoding apparatus. As an example, an indication whether the motion vector is inherited by the unit of the PU or whether the motion vector is inherited by the unit of the sub PU may be signaled by using a flag.

The decoding apparatus may decide whether the motion vector is inherited by the unit of the PU or by the unit of the sub PU based on the received information.

Referring back to FIG. 10, when it is decided that the motion vector is inherited by the unit of the sub PU, the prediction unit may bring and use a motion vector Mv1 of C'1 for the sub block C1, a motion vector Mv2 of C'2 corresponding to C2 for the sub block C2, a motion vector Mv3 of C'3 corresponding to C3 for the sub block C3, and a motion vector Mv4 of C'4 corresponding to C4 for the sub block C4 when it is decided that the motion vector is inherited by the unit of the sub PU.

Figure 11:
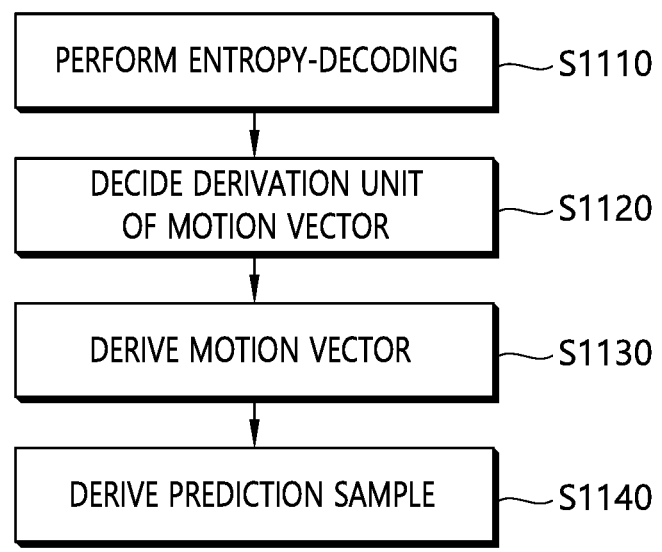
FIG. 11 is a flowchart schematically describing an operation of a decoding apparatus according to the present invention.

FIG. 11 is a flowchart schematically describing an operation of a decoding apparatus according to the present invention.

Referring to FIG. 11, the decoding apparatus entropy-decodes a bitstream to output video information required for decoding the current block (S1110). The video information includes a residual and information required for inversely transforming/dequantizing the residual, information required for generating the prediction sample, information required for applying filtering to the reconstructed picture, and the like in order to decode the current block. For example, when the current block is a block in a depth view, the video information may include information indicating whether the motion information is inherited from the texture picture. Further, when the current block is the prediction block in the depth view, that is, the PU in the depth view, the video information may include information indicating whether the motion information of the current block is derived by the unit of the sub prediction block (sub PU). The information indicating whether the motion vector is derived by the unit of the sub prediction block indicates a size of a block in which the motion information is derived to indicate whether the motion vector is derived by the unit of the prediction block or by the unit of the sub prediction block.

The video information may be transmitted at the level of the video parameter set or the extension level of the video parameter set as necessary.

The decoding apparatus may decide a unit to derive the motion vector for the current block based on the video information (S1120). As described above, the video information may include motion information derivation unit information indicating whether the motion vector is derived by the unit of the sub prediction block. The decoding apparatus may decide whether the motion information is derived by the unit of the prediction block or by the unit of the sub block (sub prediction block) based on the motion information derivation unit information.

The decoding apparatus may derive the motion vector for the current block based on the decision (S1130). When it is decided that the motion information is derived by the unit of the prediction block, the motion information (e.g., motion vector) of the current block in the depth picture may be derived from the corresponding block of the texture picture. For example, the decoding apparatus may set the motion vector of the corresponding block in the texture picture as the motion vector of the current block in the depth picture.

When it is decided that the motion information is derived by the unit of the sub prediction block, the motion information (e.g., motion vector) of the current block in the depth picture may be derived from the sub block of the corresponding block in the texture picture. For example, the decoding apparatus may set the motion vector for the sub block of the corresponding block in the texture picture as the motion vector for the sub block of the current block in the depth picture.

The decoding apparatus may derive the prediction sample for the current block by using the motion vector (S1140). When the motion vector is derived by the unit of the prediction block, the decoding apparatus may derive the prediction sample by the unit of the sub block by using the motion vector. For example, the decoding apparatus may use samples in an area which a motion vector specified by the unit of the sub block indicates on the reference picture as the prediction sample for the sub block (e.g., sub prediction block) of the current block (e.g., prediction block).

When the motion vector is derived by the unit of the prediction block, the decoding apparatus may derive the prediction sample by the unit of the prediction block by using the motion vector. For example, the decoding apparatus may use samples in an area which a motion vector specified by the unit of the prediction block indicates on the reference picture as the prediction sample of the current block (e.g., prediction block).

When the prediction sample is derived, the decoding apparatus adds the prediction sample and a residual sample to derive a reconstruction sample. In the case of coding the depth, the decoding apparatus may omit in-loop filtering, and the like in order to reduce complexity.

In FIG. 11, the decoding is described, but steps after S1120, that is, a step of deciding whether the motion vector for the block of the depth map is derived by the unit of the sub block, a step of deriving the motion vector by the unit of the current block or the sub block of the current block, a step of deriving the prediction sample by using the motion vector, and driving the reconstruction sample by using the steps may be similarly performed even in the encoding apparatus.

However, the encoding apparatus may decide whether the motion vector is derived by the unit of the sub block by considering cost for coding and thereafter, entropy-encode related information and transfer the related information to the decoding apparatus.

In the aforementioned illustrated system, methods have been described based on flowcharts as a series of steps or blocks, but the methods are not limited to the order of the steps of the present invention and any step may occur in a step or an order different from or simultaneously as the aforementioned step or order. The aforementioned exemplary embodiments include examples of various aspects. Therefore, all other substitutions, modifications, and changes of the present invention that belong to the appended claims can be made.

What is claimed is:

1. A video decoding apparatus decoding a multi-view video, the video decoding apparatus comprising:
   an entropy-decoding unit to entropy-decode a bitstream to output video information required for decoding a current coding block in a depth picture;
   a memory to store pictures referenced when decoding the current coding block; and
   a prediction unit to decide whether an intra prediction is applied to the current coding block or whether an inter prediction is applied to the current coding block based on the video information, decide whether motion information for each sub block of a current prediction block of the current coding block is derived from a corresponding sub block of a corresponding texture block in a texture picture based on indication information when the inter prediction is applied to the current coding block, derive the motion information for the each sub block of the current prediction block from motion information for the corresponding sub block of the corresponding texture block when the indication information indicates the motion information for the each sub block of the current prediction block is derived, derive a prediction sample for the each sub block of the current prediction block by using motion information for the each sub block of the current prediction block,
   wherein the video information includes indication information indicating whether the motion information for each sub block of the current prediction block is derived.

2. The video decoding apparatus of claim 1, wherein the texture picture is a picture of the same time as the depth picture, and the corresponding texture block in the texture picture is a block positioned at the same location as the current prediction block in the texture picture.

3. The video decoding apparatus of claim 1, wherein when the indication information indicates that the motion information for the each sub block of the current prediction block is derived, the prediction unit derives a motion vector for the each sub block of the current prediction block from a motion vector for the corresponding sub block of the corresponding texture block in the texture picture.

4. The video decoding apparatus of claim 3, wherein the corresponding sub block of corresponding the texture block in the texture picture corresponds to the each sub block of the current prediction block.

5. A video decoding method decoding a multi-view video by a decoding apparatus, the video decoding method comprising:
   entropy-decoding a bitstream to derive video information required for decoding a current coding block in a depth picture;

deciding whether an intra prediction is applied to the current coding block or whether an inter prediction is applied to the current coding block based on the video information;

when the inter prediction is applied to the current coding block, deciding whether motion information for each sub block of a current prediction block of the current coding block is derived from a corresponding sub block of a corresponding texture block in a texture picture based on indication information;

when the indication information indicates the motion information for the each sub block of the current prediction block is derived, deriving the motion information for the each sub block of the current prediction block from motion information for the corresponding sub block of the corresponding texture block; and deriving a prediction sample for the each sub block of the current prediction block by using the motion information for the each sub block of the current prediction block, wherein the video information includes the indication information indicating whether the motion information for each sub block of the current prediction block is derived.

6. The video decoding method of claim 5, wherein the texture picture is a picture of the same time as the depth picture, and the corresponding texture block is a block positioned at the same location as the current prediction block in the texture picture.

7. The video decoding method of claim 5, wherein when the indication information indicates that the motion information for the each sub block of the current prediction block is derived a motion vector for the each sub block of the current prediction block is derived from a motion vector for the corresponding sub block of the corresponding texture block in the texture picture.

8. The video decoding method of claim 7, wherein
the corresponding sub block of the corresponding texture block corresponds to the each sub block of the current prediction block.

* * * * *